July 9, 1963 — W. D. GIBSON — 3,096,935
SPACE TEMPERATURE CONTROL
Original Filed Feb. 29, 1960 — 3 Sheets-Sheet 1
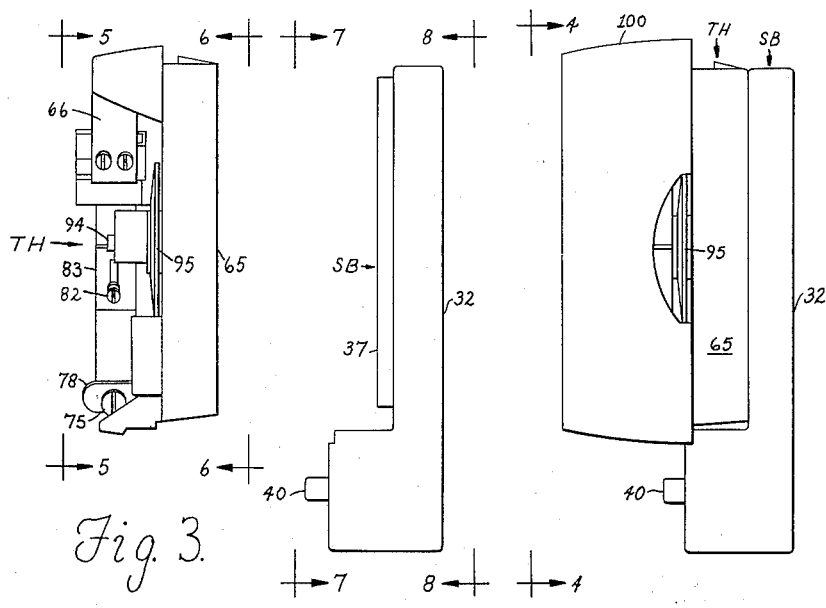
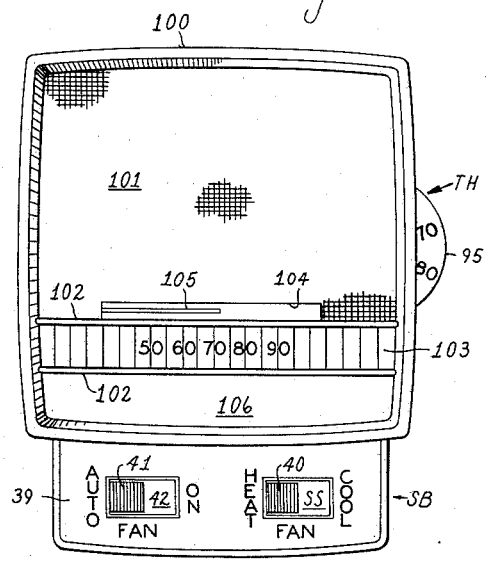
INVENTOR
WILLIAM D. GIBSON
BY Charles E. Markham
HIS AGENT

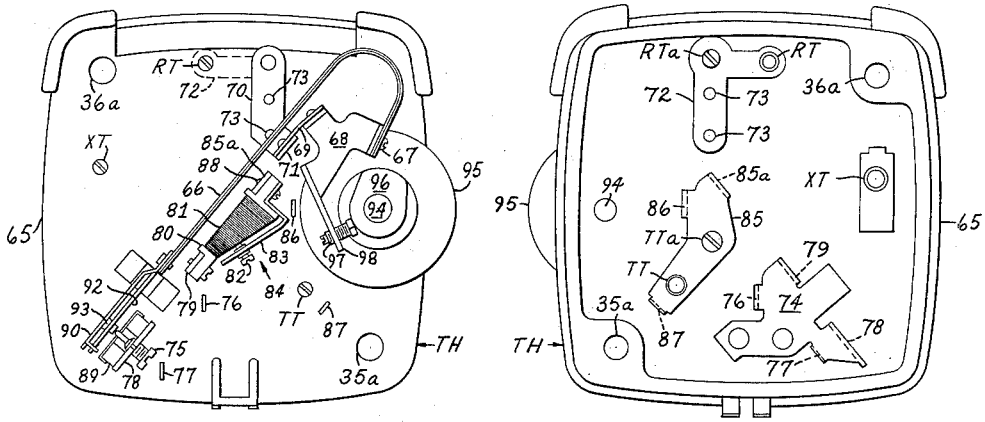
Fig. 5.  Fig. 6.
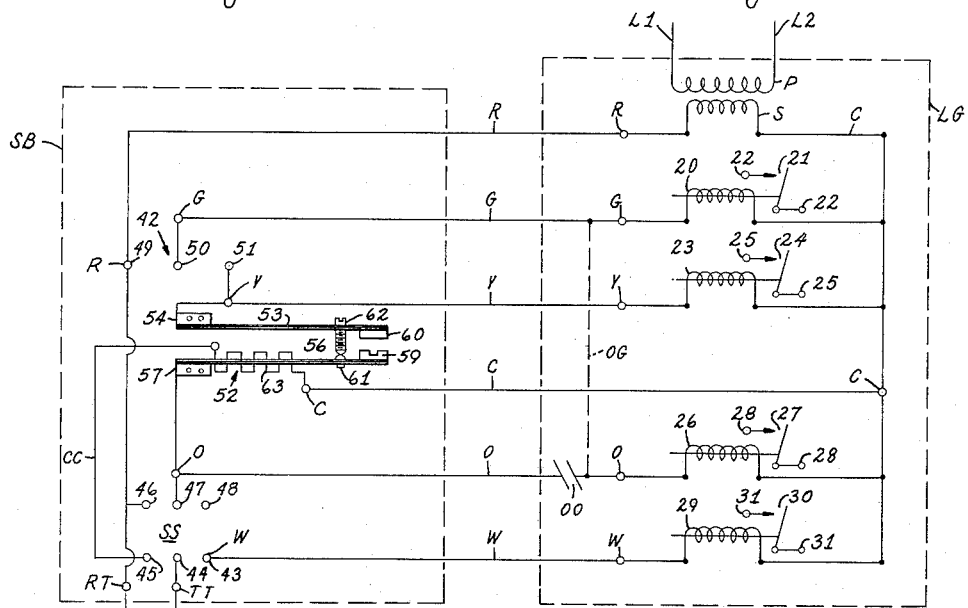
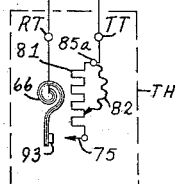
Fig. 9.

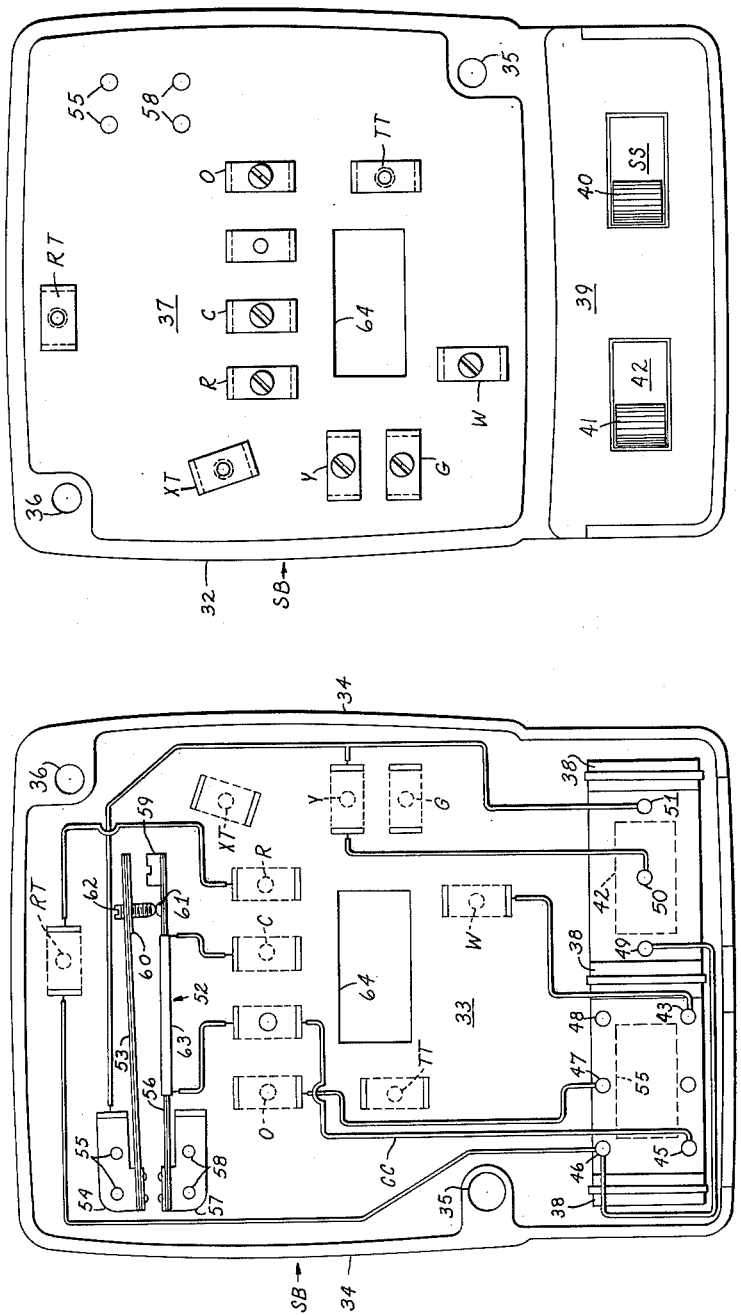

3,096,935
SPACE TEMPERATURE CONTROL
William D. Gibson, Portland, Oreg., assignor, by mesne assignments, to White-Rodgers Company, a corporation of Missouri
Continuation of application Ser. No. 11,647, Feb. 29, 1960. This application May 2, 1961, Ser. No. 107,209
6 Claims. (Cl. 236—1)

This invention relates generally to means for sensing the temperature within an occupied space and in response thereto to increase or decrease the temperature therein as required for comfort of the occupants.

This application is a continuation of applicant's co-pending application, Serial No. 11,647, filed February 29, 1960, and now abandoned.

More particularly this invention relates to the combination of a single thermostat for controlling the heating means that supplies heat to a space as required, with means adapting the thermostat additionally to control a cooling means for removing heat from the space as required together with means at the thermostat for switching the thermostat to the control of a selected one of the heating means or the cooling means.

It is a primary object of this invention to provide for a year-round space air conditioning system, a first equipment arrangement operable to supply heat to the space as required and a second equipment arrangement operable to remove heat from the space as required, together with a single thermostat responsive to the temperature in said space and selective means for placing a selected one of said first or second equipments under the control of said single thermostat as required to maintain a desired temperature condition in said space.

It is a second object of this invention to provide a base for said thermostat with means for wall mounting of said base with said thermostat thereon.

It is a third object to provide a sub-base for said thermostat with means for mounting said sub-base on the wall by said means for mounting said base together with common means for mechanically securing said base on said sub-base and electrically connecting the electrical circuit of said thermostat from said base to the electrical circuits of said equipments and said selective means on said sub-base.

It is a fourth object to provide the sub-base with said electrical circuits for said equipments and said selective means including a double pole, double throw switch and a normally closed thermally actuated switch, said double throw switch being connected with circuit means including one pole of one throw thereof to render operable by said thermostat the first equipment for supplying heat to the space, including both poles of the other throw thereof to render operable by said thermostat the second equipment for removing heat from the space and when neither throw of said switch is closed to render both of said equipments inoperative to change the heat content of said space.

It is an especial object of this invention to provide for use with said thermostat and said second equipment when the double throw switch is in the other throw position thereof, an electric switch having a pair of substantially parallel bimetal electrical conducting switch blades each insulatedly anchored at one of their adjacent ends to said sub-base to bend in the same direction in response to ambient temperature, said blades being biased normally to maintain in contact one with the other a pair of electrical contacts respectively secured to the free ends of said blades to complete a series circuit through a source of power, an actuator for said second equipment, and said switch, one of said bimetal blades of said electric switch having electrical insulatedly associated therewith an electrical resistance in series with said source of power and said thermostat when said thermostat is closed to energize the electric resistance heater to open said electric switch to de-activate said second equipment to stop the withdrawal of heat from said space when said thermostat closes to indicate a need for heat in the space.

It is another especial object to provide for use with said thermostat and said second equipment, an ambient temperature compensated, normally biased to closed position, heat energized to open position, electric switch for time delay operation of said second equipment in correct response thereof to the opening and closing operation of said single thermostat.

How these and other objects are attained is explained in the following description referring to the attached drawing, in which:

FIG. 1 is a view in side elevation of the thermostat with its cover and sub-base of this invention;

FIG. 2 is a view in side elevation of the thermostat sub-base of this invention;

FIG. 3 is a view in side elevation of the thermostat of this invention;

FIG. 4 is a view in front elevation of the thermostat with its cover and sub-base as seen from line 4—4 of FIGURE 1;

FIG. 5 is a view in front elevation of the thermostat of this invention with its cover and sub-base removed, as seen from line 5—5 of FIG. 3;

FIG. 6 is a view in rear elevation of the thermostat of this invention with its cover and sub-base removed, as seen from line 6—6 of FIG. 3;

FIG. 7 is a view in front elevation of the sub-base of this invention with the thermostat removed as seen from line 7—7 of FIG. 2;

FIG. 8 is a view in rear elevation of the sub-base of this invention with a rear cover and the thermostat of FIG. 5 removed, as seen along line 8—8 of FIG. 2; and FIG. 9 is a schematic wiring diagram showing circuits of the thermostat and sub-base and the group of the load relays operated thereby.

Like reference letters and numerals refer to like parts in the several figures of the drawing.

Referring now to the drawing, the general scheme of operation of the invention is seen in FIG. 9 where the lower left dotted outline TH encloses the electrical circuit scheme of the thermostat TH of FIGS. 3, 5, and 6. The left dotted outline SB encloses the electrical circuit scheme of the thermostat sub-base SB. And the right dotted outline encloses the electrical circuit scheme of a typical load group of power relays LG, the low voltage operating coils of which are controlled by the thermostat TH with its sub-base SB.

Typically the remote load group LG includes line voltage power source L1–L2 continuously energizing primary power coil P of control transformer PS of which the secondary of low voltage coil S is the source of control low voltage continuously available between control lines R and C.

Assuming, for instance, that the equipment for supplying heat to the occupied space is an automatically fired oil burning warm air furnace having a warm air blower for circulating warm air as required through a system of air ducts connecting the furnace warm air chamber with the occupied space and the equipment for removing heat from the occupied space is an air cooling refrigerating system having a motor driven compressor, a cooling air chamber with a refrigerant evaporator therein, a motor driven damper for selectively connecting either the warm air chamber or the cool air chamber to the air ducts leading to the occupied space and a cool air circulating fan to circulate the cool air through the duct system when the occupied space requires removal of heat therefrom, then it is understood that a double throw, double pole system selector switch SS is required to be located on thermostat sub-base SS to be set in its center or "off" position to hold the system out of operation or to be set to one throw to operate the system for heating the space or in the other position to operate the system for cooling the space.

Continuing with FIG. 9 the control voltage (usually 24 volts, 60 cycle, 1 phase) is impressed by the secondary coil S of control transformer PS between lines R and C at all times, thus, when the control line R is connected with line G the operating coil 20 of fan motor starting switch 21 is energized to close the energizing circuit 22 of the cool air circulating fan motor, not shown.

Similarly, when line R is connected with line Y, the operating coil 23 of cooling equipment starting switch 24 is energized to close the energizing circuit 25 of the referigerator motor and other electrical accessories, not shown.

Again, when line R is connected with line O, the operating coil 26 of damper motor starting switch 27 is energized to close the energizing circuit 28 of the damper motor and accessories, not shown. It is understood that in effect the damper is biased towards its position of connection of the circulating air ducts to the warm air chamber and when its motor is energized the damper is moved to its position of connection of the circulating air ducts to the cool air chamber and the cool air circulating fan.

And, finally, when line R is connected with line W, the operating coil 29 of the heating equipment starting switch 30 is energized to close the energizing circuit 31 of the warm air furnace oil burner motor, warm air circulating fan motor, and accessory electrical equipment, not shown.

Referring now to FIGS. 1, 2, 4, 7, and 8, it is seen that sub-base SB carries all of the electric parts indicated in FIG. 9 to be included in Section SB and that these parts are seen in FIGS. 7 and 8 to be carefully and securely mounted on a one-piece molded plastic support 32 as seen in FIGS. 1, 2, and 4.

Molded plastic insulating support 32 is shown to be formed with a substantially flat rear face 33 sunk below an upstanding surrounding rim 34 through which at opposite corners holes 35—36 are formed perpendicularly to face 33.

On the front sub-base molded support 32, flat front face 37 parallel to rear face 33 is raised above the forward extension of rim 34.

Near the lower end of sub-base SB a rectangular trough 38 is sunk into rear surface 33 with the bottom wall of trough 38 forming on the front side of support 32 a raised switch cover plate 39 formed with two rectangular holes therethrough to receive the operating handles 40—41, respectively, of double throw system switch SS and fan switch 42. Switches SS and 42 are secured into trough 38 (FIG. 8) with their electric terminals 43, 44, 45, 46, 47, 48, 49, 50, and 51, respectively, open to the rear of sub-base SB from the open top of trough 38.

Thermostat reversing relay 52, FIGS. 8 and 9, includes bimetal blade 53 supported at one end on brass bracket 54 secured on face 33 of support 32 of sub-base SB by rivets 55 and bimetal blade 56 supported at one end on brass bracket 57 secured on face 33 of support 32 by rivets 58. Permanent magnet 59 secured on the free end of blade 56 and steel armature 60 secured on the free end of blade 53 together bias blades 53-56 into contact of electric contact 61 with adjustable electric contact 62. Blades 53—56 are positioned to be ambient temperature compensated to bend in the same direction on a change in ambient temperature. Thus, switch 61—62 of relay 52 is normally closed and is opened by separately overheating blade 56 by passing current through resistance heater 63 insulatedly secured around blade 56.

It will be noted from FIG. 9 that the circuits of thermostat sub-base SB mounted on the wall of the occupied space are connected with the circuits of the load relay group LG, located remotely from the occupied space, by the circuit wires R, G, Y, C, O, and W, which leave the wall on which sub-base SB is mounted on its rear face (FIG. 8) and pass through hole 64 in sub-base part 32 to its front face (FIG. 7) where the wires are secured respectively to sub-base terminals R, G, Y, C, O, and W. These terminals are brass staples, each with a back drilled and tapped to receive a terminal screw (FIG. 7) and perpendicular ends passing through sub-base part 32 to form soldering terminals (FIG. 8) for continuing the circuit wiring of sub-base SB.

Referring now to FIGS. 2, 3, 5, 6, and 7, it is seen that the thermostat TH has a molded plastic supporting structure 65 on which its functional elements are mounted as follows. The curved end of bimetallic temperature sensitive element 66 is adjustably positioned by screws 67 on cam bracket 68 resiliently held by spring hinge 69 rotatably about the upstanding end 71 of supporting bracket 70 which with back plate 72 is secured to molded plastic support 65 by rivets 73. Brass supporting bracket 74 for thermostat stationary contact screw 75 lays flat against the rear side of molding 65 (FIG. 6) and is held in place thereon by two rivet legs 76—77, contact support dial leg 78, and support leg 79, for insulating core 80 of resistance wire 81 which with sliding contact 82 on brass slider support 83 comprises the heat anticipating heater 84 of the thermostat TH. Support bracket 85 for the other end of the heater 84 lies flatly against the rear side of molding 65 of thermostat TH where it is held in place by rivet legs 86—87 and leg 85a which supports the other end of core 80 and is electrically connected to slider support 83 by screw 88.

Permanent magnet 89 clamped to stationary contact setting, dial supporting leg 78 of bracket 74, together with armature 90 and resilient moving contact blade 92 riveted at 91 to bimetal blade 66, give snap action to the moving contact 93 on blade 92.

Rotatably mounted on axle 94 secured in molded support 65 is a temperature setting indicating dial 95 and setting cam 96. With the thermostat dial 95 set to indicate the known ambient temperature of the bimetal element 66 and cam follower screw 97 so positioned with respect to lever 98 of cam bracket 68 that blade 66 opens and closes the circuit through contacts 75—93 on minute turnings of screw 97 in opposite directions, the thermostat is properly adjusted for its duty.

Remembering that thermostat TH will most often be mounted on the wall by itself to control an automatically fired space air heating plant, it is seen that molding 65 is formed with diagonally positioned mounting screw holes 35a—36a and brackets 72 and 85 are drilled and tapped to receive treminal screws RTa and TTa for attaching the thermostat wires of the burner control system.

Then later when it is decided to add summer cooling to make of the system a year-round air conditioner, longer mounting screws are used to go first through holes 35a—36a of the thermostat TH and then through holes 35—36 of sub-base SB and then into the wall to provide a unitary thermostat structure for year-round use. When the cooling equipment is added as above noted, the control wires from the remote load group LG (FIG. 9) are brought into the hole 64 through the back of sub-base SB and are attached as previously noted to their respective terminal screws on the front (FIG. 7) of sub-base SB. Then the thermostat TH is positioned over the sub-base SB and the longer mounting screws are used to secure the thermostat to the sub-base on the wall.

With the thermostat TH and the sub-base SB thus aligned, the tapped holes in terminals RT, TT, and XT of sub-base SB are in position to receive screws RT, TT, and XT which extend from the front of thermostat molded support 65 therethrough, and out of the back thereof. By turning screws RT, TT, and XT, the thermostat TH and the sub-base are mechanically secured together at RT, TT, and XT and properly connected together electrically at RT and TT. XT is not an electrical connection.

When the thermostat is wall-mounted and ready for use, a thermostat cover 100 is snapped thereon in the position shown in FIGS. 1 and 4. The front face of cover 100 is seen to have a grid-marked sunken background 101 with a pair of vertically spaced horizontal ribs 102 between which is a horizontal dial 103 and above which is a horizontal window 104 behind which is a horizontal glass thermometer 105 calibrated with dial 103. Space 106 is for the trademark or name of the system manufacturer.

Referring again to FIG. 9, the double throw, double pole system switch SS does not use its contact 48 so that when the handle 40 is moved to the right (or the left in FIG. 4) the result is to connect contacts 43—44 and thus to put thermostat TH in position to connect line R to line W and put the heating system in operation by energizing starting switch operating coil 29 whenever thermostat contacts 93—75 are closed by bimetal 66 as the temperature of the occupied space falls sufficiently.

When the handle 40 of switch SS is moved back to center position, contacts 43—44 are separated to make the heating system inoperative and when the handle 40 of switch SS is moved to the left (or the right in FIG. 4), contacts 46—47 of switch SS are connected and contacts 44—45 of switch SS are connected so that the cooling system is placed under the control of thermostat TH. In the latter case the cooling system must be put into operation when the thermostat contacts 93—75 separate and must be shut down when the contacts close together.

Thus, when contacts 46—47 are closed, wire R is connected to wire O to energize the operating coil 26 of damper circuit operating switch 27. At the same time wire Y is energized from wire O through normally closed contacts 61—62 of previously described thermally operated relay 52 to energize operating coil 23 to close starting switch 24 of cooling equipment power circuit 25.

When the cooling system has run long enough to cause thermostat contacts 93—75 to close, operating heater 63 of relay 52 will be energized from lines R to C through thermostat contacts 93—75 from thermostat terminal RT to terminals TT and 44 by line CC to heater 63. Energizing heater 63 will cause bimetal blade 56 to bow downwardly away from blade 53 and separate contacts 61—62 to stop the cooling system until heater 63 cools sufficiently for contacts 61—62 to close again.

When the handle 41 of cooling air fan switch 42 is moved to the right (or the left in FIG. 4), its contacts 50—51 will connect lines Y and G so that the cool air circulating fan starting switch operating coil 20 will be energized to close cooling fan operating circuit 22 whenever the cooling system operating circuit is closed. Or, if handle 41 of cooling air fan switch 42 is moved to the left in FIG. 9 or the right in FIG. 4, its contacts 49—50 will connect line G directly to line R and the fan operating circuit 22 will be continuously energized.

Heating and cooling equipments are generally alike in purpose but individually made up for many different assortments of elements as determined by the system functions desired and the available parts or the necessity of adding on to a previously installed partial system which it is desired to bring up to date.

It is believed that the present combinations of thermostat and sub-base circuit and switch are here provided so substantially any system function can be controlled by circuit changes at the remote load group location. For instance, if the damper control wire O were broken at OO in LG, the fan circuit switch operating coil 20 and the damper circuit switch operating coil 26 could be paralleled at LG with wire OG shown dotted in FIG. 9. In this arrangement, the cooling fan would always be operated when the cooling system operates if fan switch 42 is set to "Auto," or automatic, and whether the system is in operation or not, the fan and the damper will be properly operable continuously when the switch 42 is set to "on."

Both its structure for its function and its function in its circuits are believed to be novel and unexpectedly useful characteristics of thermal relay 52. For instance, it provides a simple, non-wearing, quiet, low cost, polarity reversing relay to make the S.P.S.T. thermostat adaptable for use as either a heating control or cooling control thermostat. The inherent slow build-up of energy in heater 63 prevents noisy operation or chatter at any of the switch operators. The reversing of contact function of thermostat function for cooling also makes a similar reversing of function of heating anticipation 81 to provide the desired cooling anticipation. Relay load current through blades 53 and 56 and contacts 61—62 has no effect on the accuracy or reliability of the relay.

The foregoing description is intended to be illustrative and not limiting, the scope of the invention being set forth in the appended claims.

I claim:
1. A space temperature controller for use in optionally controlling electrically operated space heating means and electrically operated space cooling means, said controller including: a thermostat comprising a first single pole, single throw switch, a base for said switch and a switch operating means on said base responsive to the temperature of the conditioned space to cause said first switch to open upon a rise and to close upon a drop above and below a predetermined space temperature, a sub-base detachably connected to said base, said sub-base including mounted thereon a second single pole, single throw switch, a third single throw, double pole switch, and a fourth temperature responsive, normally closed, single pole, single throw switch; said fourth switch being required to be heated to a temperature considerably above the controlled space temperature to effect its opening, an electrical resistance heater mounted on said sub-base operative when energized to heat said fourth switch and effect its opening, a single selector handle for operating both said second and third switches having a neutral position in which both said switches are open, a first throw position in which only said second single pole switch is closed and a second throw position in which only both poles of said third switch are closed; and said sub-base further including thereon a first circuit means operative when said selector handle is in said first throw position and when said first switch is closed to complete an energizing circuit for electrically operated space heating means, and a second circuit means operative when said selector handle is in its second throw position and when said fourth switch is closed to complete an energizing circuit for electrically operated space cooling means and to complete an energizing circuit for said electrical resistance heater through said first switch when it is closed, thereby to effect the opening of said fourth switch and thereby to break the energizing circuit for the space cooling means.

2. The space temperature controller of claim 1 in which the said first single pole, single throw switch includes a second electric resistance heater in series therewith and operative when said first switch is closed to add heat to said temperature responsive operating means to effect the opening of said first switch in anticipation of its opening slightly later in response to a space temperature rise, and said resistance heater being operative at all times when said first switch is closed whether the selector handle is in a position in which said first switch is operative to control a circuit for electrically operated space heating means or in a position in which said first switch is controlling a circuit for electrically operated space cooling means through its control of said fourth switch by means of the resistance heater.

3. The space temperature controller of claim 1 in which said sub-base has a rear wall mounting face and a front face which lies against said thermostat base and is provided with a hole therethrough to receive circuit leads from remotely located space heating and space cooling means for attachment to circuit terminals of said controller mounted on the front face, and at least some of said terminals on the front face of said sub-base being threaded and tapped to receive terminal screws extending through said base to mechanically secure said base to said sub-base and electrically connect electrical circuits on said base and sub-base.

4. In a space thermostat for controlling space heating and space cooling apparatus having pairs of terminals for the connection thereto of external circuits for electrically operated heating and cooling apparatus; a source of electrical power, a first bimetal-actuated, single pole, single throw switch which opens upon a rise and closes upon a drop above and below a predetermined temperature of the conditioned space, circuit connections including said first switch connecting a first pair of terminals to which leads of an external circuit for electrically operated heating apparatus are to be connected, a second single pole, single throw, bimetal-actuated switch which is normally closed at ambient temperatures and opens only when heated, circuit connections including said second switch connecting a second pair of terminals to which leads of an external circuit for electrically operated cooling apparatus are to be connected, an electrical resistance heater operative when energized to heat said second bimetal-actuated switch and effect its opening, and means including additional circuit connections completed through said first bimetal-actuated switch when it is closed for connecting said resistance heater across said source of power, and a manual switch for selectively completing or breaking said circuit connections connecting said first pair of terminals.

5. A space thermostat as claimed in claim 4 in which said manual switch is a double throw, double blade switch arranged to complete said circuit connections connecting said second pair of terminals and said additional circuit connections for said resistance heater and to break said circuit connections connecting said first pair of terminals when in one throw position, and to complete said circuit connections for said first pair of terminals and break said circuit connections for said second pair of terminals and said resistance heater when in its other throw position.

6. In a space thermostat for controlling both space heating and space cooling apparatus, a mounting base, a pair of terminals mounted thereon, electrical conductor means on said base connecting said terminals including a bimetal-actuated switch mounted on said base which opens upon a rise and closes upon a drop in the temperature of the space being conditioned thereby to control an external circuit for electrically operated heating means to be connected to said terminals, a sub-base detachably connected to said base, a pair of terminals mounted thereon, electrical conductor means on said sub-base connecting said terminals, said conductor means including a second bimetal-actuated switch mounted on said sub-base for controlling an external circuit for electrically operated cooling means to be connected to said sub-base terminals, said second bimetal-actuated switch being normally closed at ambient temperatures and opening only when heated, an electrical resistance heater mounted on said sub-base and operative when energized to heat said second bimetal-operated switch and effect its opening, a source of electrical power, and means including contacting conducting elements on said base and said sub-base and including said first bimetal-actuated switch on said base when it is in a closed position for connecting said resistance heater across said power source, thereby to energize it, whereby said second bimetal-actuated switch is opened to break the cooling apparatus circuit when said first bimetal actuated switch is closed and said second switch is permitted to close to complete the cooling apparatus circuit when said first switch opens.

References Cited in the file of this patent
UNITED STATES PATENTS

| | | |
|---|---|---|
| 2,062,345 | Wilheim | Dec. 1, 1936 |
| 2,301,708 | Roessler | Nov. 10, 1942 |